2,912,419

HYDROCARBON POLYMERIZATION (GROUP 5A METAL OXIDE AND AlR₃ INITIATOR)

Edwin F. Peters, Lansing, and Bernard L. Evering, Chicago, Ill., assignors to Standard Oil Company, Chicago, Ill., a corporation of Indiana No Drawing. Application March 8, 1955
Serial No. 493,073

27 Claims. (Cl. 260—93.7)

This invention relates to a process for the preparation of high polymers, being usually normally solid materials, from charging stocks comprising essentially normally gaseous mono-olefins in the presence of novel catalysts comprising essentially an oxide of a metal of group 5a of the periodic table and certain compounds of aluminum.

One object of our invention is to provide novel combinations of catalysts for the conversion of normally gaseous mono-olefins to high molecular weight polymers, especially normally solid polymers. Another object is to provide a low temperature, low pressure process for the conversion of ethylene-containing gases to high molecular weight, resinous materials characterized by high density and crystallinity. Still another object is to provide a novel catalytic process for the conversion of propylene-containing gases to normally solid polymers, especially relatively crystalline modifications of solid polypropylenes. Yet another object is to provide processes for the co-polymerization of ethylene and/or propylene-containing mixtures with various co-monomers to produce resinous products. An additional object is to provide new polymerization catalysts to effect the above and other objects which will become apparent from the ensuing description of our invention.

Briefly, the inventive process comprises the conversion of a normally gaseous mono-olefin to high molecular weight, normally solid polymers by contact with a catalyst comprising an oxide of group 5a of the periodic table and, as co-catalyst, an aluminum compound conforming to the general formula $AlR_3$, wherein R is selected from the group consisting of hydrogen and mono-valent hydrocarbon radicals. The polymerization or co-polymerization process can be effected at suitable temperatures within the range of about 50 to about 230° C. and pressures ranging upwardly from atmospheric to any desired maximum pressure, for example, 15,000, 30,000 p.s.i.g. or even higher pressures, suitably pressures between about 200 and about 5000 p.s.i.g. or about 500 to 1000 p.s.i.g.

The proportion of group 5a metal oxide catalyst, with respect to the olefin charging stock, may vary from about 0.001 to about 20 weight percent, being not usually a critical feature of our process. The proportion of $AlR_3$ compound, based on the olefinic charging stock, can be varied within the range of about 0.001 to about 10 weight percent, the precise proportion selected for use being dependent upon the desired rate of polymerization, which increases with increasing concentration of $AlR_3$ in the reaction mixture, the concentration of contaminants in the olefinic feed stock which tends to react with or destroy the $AlR_3$, the particular olefin charging stock, temperature and other reaction variables.

It is desirable to supply to the reaction zone a liquid medium which serves both as a transport medium for solid products and as a solvent for the olefin feed stock and $AlR_3$ co-catalyst. Suitable liquid reaction media for polymerization include various hydrocarbons, e.g., liquid paraffins such as n-heptane or octanes or aromatic hydrocarbons such as benzene, toluene or xylenes. The polymerization can be effected in the absence of a liquid reaction medium or solvent and solid catalyst containing accumulated solid polymers can be treated from time to time, within or outside the conversion zone, to effect removal of polymers therefrom and, if necessary, reactivation or regeneration of the catalyst for further use.

In what follows, the invention will be described in greater detail and illustrated by working examples.

The charging stock to the present polymerization process comprises essentially a normally gaseous mono-olefinic hydrocarbon, mixtures of such hydrocarbons, and mixtures comprising said hydrocarbons and co-monomers. The normally gaseous mono-olefins comprise ethylene, propylene and the butylenes. Co-monomers comprise polymerizable materials such as t-butylethylene, conjugated diolefinic hydrocarbons such as butadiene, isoprene, and the like; styrene, Ar-alkyl styrenes; various vinyl compounds such as tetrafluoroethylene, perfluoro vinyl chloride and the like. When co-monomers are employed with the principal charging stock, their proportion may range between about 1 and about 25% by weight, based on the weight of the principal charging stock, such as ethylene.

The oxide catalyst ingredients employed in the present invention are derivatives of metals of group 5a (transition series members) of the periodic table, viz. V, Cb and Ta. The group 5a oxides may be used without supports and may be pentoxides, but are preferably extended upon suitable supports and are at least partially pre-reduced to sub-pentavalent metal oxides before use and preferably before contact with the $AlR_3$ co-catalyst. The catalyst or catalysts employed in the present invention can comprise $V_2O_5$, $VO_2$, $V_2O_3$, $VO$; $Cb_2O_5$, $CbO_2$, $CbO$; $Ta_2O_5$, $TaO_2$ and the like. We prefer to employ catalysts comprising oxides of vanadium. Mixed oxides or complex oxygen compounds of group 5a metals can also be employed in the present process. Thus, in addition to the group 5a metal oxide, the catalysts may comprise oxides of copper, tin, zinc, nickel, cobalt, chromium, molybdenum, tungsten, uranium, titanium, zirconium, etc. Mixed metal oxide catalysts can readily be made by calcining the desired metal salts of oxy acids of group 5a metals, wherein the group 5a metal appears in the anion, for example, salts of metavanadic acid and the like. Thus, calcination of cobalt metavanadate yields catalysts containing cobalt oxide and an oxide of vanadium.

The catalytic activity of group 5a metal oxide catalysts is maximized by maximum exposure of surface to the reaction mixture. To this end it is sometimes desired to extend the group 5a metal oxide upon suitable high area supports (for example, between about 100 and about 500 square meters per gram), for example, activated carbon or the difficultly reducible metal oxides such as alumina, titania, zirconia, silica, synthetic aluminosilicates, clays and the like. In some instances it may be desired to employ a relatively low surface area support, of which a variety are known in the art, including tabular alumina, various fused silicates, silicon carbide, diatomaceous earths; various metals, preferably treated to produce a relatively thin surface coating of the corresponding metal oxide thereon, such as iron or steel containing a slight iron oxide coating or aluminum carrying a surface coating of aluminum oxide. We may also employ relatively high surface area, relatively non-porous supports or carriers for the group 5a metal oxide such as kaolin, zirconium oxide, iron oxide pigments, carbon black or the like.

The relative proportion of support to the catalytic metal oxide is not critical and may be varied throughout a relatively wide range such that each component is present in amounts of at least approximately 1 weight percent. The usual metal oxide:support ratios are in the range of about 1:20 to 1:1, or approximately 1:10. We may employ metal oxide catalysts composed of a supporting material containing about 1 to 80%, preferably about 5 to 35%, or approximately 10%, of vanadia or other group 5a catalytic metal oxide supported thereon.

The group 5a metal oxide can be incorporated in the catalyst support in any known manner, for example, by impregnation, coprecipitation, co-gelling and/or absorption techniques which are well known in the catalyst art. A brief review of the art of preparing supported vanadium oxide catalysts is presented in "Catalysis" edited by Dr. Paul H. Emmett (published by Reinhold Publishing Corp., N.Y. (1954), vol. 1, pages 328–9). Similar preparative methods can be employed to produce catalysts comprising oxides of columbium and tantalum, or catalysts comprising oxides of more than one group 5a metal.

In order to maximize the catalyst activity and reduce the requirements of the $AlR_3$ co-catalysts, it is preferable to effect partial reduction of catalysts comprising group 5a metal pentoxide before use in the polymerization process. The parital reduction and conditioning treatment of the solid metal oxide catalysts is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc. may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation can be varied from subatmospheric pressures, for example even 0.1 pound (absolute), to relatively high pressures up to 3000 p.s.i.g., or even more. The simplest reducing operation may be effected with hydrogen at about atmospheric pressure. Reducing gases such as carbon monoxide and sulfur dioxide may be used under substantially the same conditions as hydrogen. Dehydrogenatable hydrocarbons are usually employed at temperatures of at least about 450° C. and not above 850° C. Examples of dehydrogenatable hydrocarbons are acetylene, methane and other normally gaseous paraffin hydrocarbons, normally liquid saturated hydrocarbons, aromatic hydrocarbons such as benzene, toluene, xylenes and the like, normally solid polymethylenes, polyethylenes or paraffin waxes, and the like.

The proportion of group 5a metal oxide catalyst, based on the weight of the mono-olefinic charging stock, can range upwardly from about 0.001 weight percent to 20 weight percent or even more. In a polymerization operation carried out with a fixed bed of catalyst, the catalyst concentration relative to olefin can be very much higher. The efficiency of the group 5a metal oxide catalysts is extremely high in the presence of $AlR_3$, co-catalysts, so that said metal oxide catalysts can be employed in very small proportions, based on the weight of charging stock, for example, between about 0.01 and about 10 weight percent, while maintaining high conversion efficiency. Moreover, in view of the high efficiency of the catalyst combinations employed in the present process, it is possible to operate in a practical manner with relatively low surface area group 5a metal oxide catalysts, for example, fused vanadia catalysts, or vanadia-silica glazes, unsupported or supported in a very desirable manner, for example, upon the walls of the reactors or in similar fashion.

The $AlR_3$ compounds which can be used in practising our invention include compounds conforming to the general formula:

wherein $R_1$, $R_2$ and $R_3$ may be the same or different monovalent radicals selected from the class consisting of hydrogen and monovalent hydrocarbon radicals. Examples of suitable R groups include an aryl radical, aliphatic hydrocarbon radical or derivative, such as alkyl, cycloalkyl-alkyl, cycloalkenyl-alkyl, aryl-alkyl, cycloalkyl, alkyl-cycloalkyl, aryl-cycloalkyl, cycloalkyl alkenyl, alkyl-aryl or cycloalkyl-aryl radicals.

Specific examples of R groups for substitution in the above formula include methyl, ethyl, n-propyl, isopropyl, isobutyl, n-amyl, isoamyl, hexyl, n-octyl, n-dodecyl, and the like; 2-butenyl, 2-methyl-2-butenyl and the like; cyclopentyl-methyl, cyclohexyl-ethyl, cyclopentyl-ethyl, methylcyclopentylethyl, 4-cyclohexenylethyl and the like; 2-phenylethyl, 2-phenylpropyl, β-naphthylethyl, methylnaphthylethyl, and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl and the like; phenylcyclopentyl, phenylcyclohexyl, the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, cyclohexylphenyl and other $AlR_3$ compounds of the type disclosed and suggested in German Patent 878,560.

The proportion of $AlR_3$ co-catalyst, based on the weight of the olefinic charging stock, can range from about 0.001 to 20 weight percent or even more, although it is usually employed in proportions between about 0.001 and about 10 weight percent, e.g., usually about 0.01 to about 5 weight percent.

The olefinic charging stock can be polymerized in the gas phase, but it is highly desirable to effect polymerization in the presence of a substantially inert liquid reaction medium which functions as a partial solvent for the monomer, which may function as a solvent for the $AlR_3$ co-catalyst and which also functions as a liquid transport medium to remove normally solid polymerization products as a dispersion in said medium from the polymerization reactor, thus permitting efficient and continuous polymerization operations.

Particularly suitable liquid reaction media are various classes of hydrocarbons or their mixtures which are liquid and substantially inert under the polymerization conditions of the present process. Certain classes of aliphatic hydrocarbons can be employed as a liquid hydrocarbon reaction medium in the present process. Thus we may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

Members of the aromatic hydrocarbon series, particularly the mononuclear aromatic hydrocarbons, viz., benzene, toluene, xylenes, mesitylene and xylene-p-cymene mixtures can also be employed. Tetrahydronaphthalene can also be employed. In addition, we may employ such aromatic hydrocarbons as ethylbenzene, isopropylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

We may also employ a liquid hydrocarbon reaction medium comprising liquid olefins, e.g., n-hexenes, cyclohexene, octenes, hexadecenes and the like.

The liquid hydrocarbon reaction medium should be freed of poisons before use in the present invention by acid treatment, e.g. with anhydrous p-toluenesulfonic acid, sulfuric acid, or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

Temperature control during the course of the polymerization process can be readily accomplished owing to the presence in the reaction zone of a large liquid mass having relatively high heat capacity. The liquid hydrocarbon reaction medium can be cooled by heat exchange inside or outside the reaction zone.

It is desirable to minimize or avoid the introduction of water, oxygen, carbon dioxide, acetylene or sulfur compounds into contact with the catalyst or co-catalyst. Any known means may be employed to purify the olefinic charging stocks of these materials prior to their introduction into the polymerization reactor.

The contact time or space velocity employed in the polymerization process will be selected with reference to the other process variables, catalysts, the specific type of product desired and the extent of olefin conversion desired, in any given run or pass over the catalyst. In general, this variable is readily adjustable to obtain the desired results. In operations in which the olefin charging stock is caused to flow continuously into and out of contact with the solid catalyst, suitable liquid hourly space velocities are usually between about 0.1 and about 10 volumes, preferably about 0.5 to 5 or about 2 volumes of olefin solution in a liquid reaction medium. The amount of olefin in such solutions may be in the range of about 2 to 50% by weight, preferably about 2 to about 10 weight percent or, for example, about 5 to 10 weight percent.

The following specific examples are introduced as illustrations of our invention and should not be interpreted as an undue limitation thereof. The ethylene employed in the polymerization reactions was a commercial product containing oxygen in the range of about 15 to 50 p.p.m. The benzene employed in some of the examples was a commercial product of analytical grade, free of thiophene, dried before use by contact with sodium hydride. The aluminum trimethyl promoter was prepared by the reaction of aluminum with methyl iodide (J.A.C.S. 68, 2204 (1946)) and was vacuum fractionated at 100/1 reflux ratio before use (boiling range 65–7° C. under 84 mm. of Hg).

*Example 1*

The group 5a metal oxide catalyst was 17 weight percent $V_2O_5$ supported upon an activated alumina carrier. It was prepared as follows: 100 ml. of distilled water was brought to boiling and then 33.2 g. of oxalic acid and 15.6 g. of $V_2O_5$ were added. The $V_2O_5$ was added over the course of about one hour, yielding a soluble green aqueous complex. The solution was filtered hot and then poured over 76.5 g. of ⅛-inch pills of activated (gamma-) alumina. The mixture was evaporated to dryness with stirring and then calcined at about 510° C. and atmospheric pressure for 12 hours.

A steel rocker bomb of about 300 ml. of capacity was charged with 20 g. of the metal oxide-alumina catalyst. The reactor was also charged with 105 g. of benzene and 49 g. of ethylene. The aluminum trimethyl co-catalyst (2.0 g.) was introduced into the reactor in a sealed glass vial, which was broken beneath the surface of the benzene solvent. Polymerization was effected at temperatures which were varied during the operation from 25° C. to 104° C. and ethylene pressures varying from 300 to 1000 p.s.i. The total contact period was 4 hours. Although there was no apparent diminution in catalytic activity at the end of 4 hours, it became necessary to shut down the reactor because it was plugged with a solid polymer of ethylene and it became difficult to supply ethylene even at 1000 p.s. i. Accordingly, ethylene supply was discontinued, the reactor was allowed to cool to room temperature and gases were vented therefrom to atmospheric pressure. The reactor was found to be packed with a tough, white, solid polymer of ethylene, 34 g., having a melt viscosity of $1.4 \times 10^8$ (method of Dienes and Klemm, J. Appl. Phys. 17, 458–78 (1946)) and density (24/24° C.) of 0.9756. Analysis of the reaction mixture showed that none of the ethylene had been converted to normally gaseous or normally liquid products.

The high molecular weight, extremely high density polyethylenes have high tensile and impact strengths and minimized capacity to absorb odors, flavors and various solvents. They open a new field of uses for polyethylenes in many attractive applications, such as in carboys or other packaging means, plastic pipe, etc.

Vanadia catalysts alone under the above operating conditions or, in fact, over a broad range of operating conditions, do not effect the conversion of ethylene to a normally solid polymer. Aluminum trimethyl alone is likewise ineffective for the conversion of ethylene to a normally solid polymer under the above operating conditions. The combination of catalysts produces striking and unexpected results, viz. high conversion rates and solid polymers. Furthermore the solid polymers have an almost unbranched structure, high crystallinity and high molecular weight.

That the polymerization process of the present invention is due to the specific interaction of the specified catalyst components with the olefinic feed stocks will be apparent from the following comparative run in which aluminum trimethyl was used with activated alumina in an attempt to polymerize ethylene:

A 500 cc. Magne-dash reactor was charged with 10 g. of activated alumina, which had been calcined in a muffle furnace at 510° C. and atmospheric pressure for 12 hours. The reactor was then charged with 40 g. of benzene and a vial of aluminum trimethyl was broken beneath the surface of the benzene to supply 2.7 g. of the co-catalyst. The reactor was then closed and charged with 60 g. of ethylene. The contents of the reactor were heated over the range of 20 to 115° C. under ethylene pressures varying between 500 and 900 p.s.i. over a period of 3 hours. No ethylene pressure drop was noted under any of the experimental conditions. It was found that none of the ethylene had been polymerized in this operation.

*Example 2*

The metal oxide catalyst was 17 weight percent $V_2O_5$ supported on activated alumina prepared and activated by the method described in Example 1. The reactor was charged with 0.05 g. of the finely powdered metal oxide catalyst and 102 g. of benzene. Aluminum trimethyl was introduced into the reactor by the method of Example 1 in the amount of 1.5 g. The reactor was then closed, pressured with ethylene and the temperature of the contents brought to 104° C. under 1000 p.s.i. ethylene pressure. The total quantity of ethylene charged was 50 g. The total contacting period was 20 hours. The products were worked up as in Example 1 to yield 10 g. of a solid polymer of ethylene having a melt viscosity of $4.1 \times 10^{10}$. It will be noted that substantial ethylene conversion was achieved to form a very high molecular weight polymer through the use of only 0.017 weight percent of $V_2O_5$, based on the total weight of ethylene charged. Ethylene was not converted to gaseous or liquid polymers. These data indicate the enormous efficiency of the particular catalyst-co-catalyst system herein employed.

*Example 3*

The rocking autoclave was charged with 9 g. of powdered commercial $V_2O_5$, used without any supporting material. The $V_2O_5$ had been calcined at 600° C. and atmospheric pressure for 12 hours before use. The reactor charge also comprised 102 g. of benzene, 2.9 g. of aluminum trimethyl and 46 g. of ethylene. The reactor contents were heated to 115° C. under 1000 p.s.i. of ethylene for a total contacting period of 3 hours. The reaction products were worked up as in Example 1. The reaction yielded 38 g. of a solid polymer of ethylene. No gaseous or liquid products were produced.

*Example 4*

A catalyst was prepared by coating $V_2O_5$ on metallic aluminum containing a surface coating of aluminum oxide. Commercial aluminum turnings (99.99% aluminum) were calcined at 535 to 540° C. for one hour to provide a suitable surface coating of $Al_2O_3$ on aluminum metal. A solution was prepared by adding 1.1 g. of oxalic acid to 60 cc. of boiling distilled water and thereafter adding 0.4 g. of $V_2O_5$. The resultant solution was poured over 32.2 g. of the surface-oxidized aluminum turnings and the mixture was stirred and evaporated to dryness. The resultant product was calcined at 535–540° C. for 12 hours. The reactor was charged with the resultant catalyst, 102 g. benzene, 2.1 g. of aluminum trimethyl and 52 g. of ethylene. The reactor contents were heated, while being rocked, to 138° C. under maximum ethylene pressure of 1000 p.s.i. for a total contact period of 5 hours. The products were worked up as in Example 1 to yield 34 g. of a solid polymer of ethylene having a high molecular weight and density. Analysis indicated that none of the ethylene had been converted to gaseous or liquid products.

When essentially the same procedure of polymerization was used but the aluminum turnings were not pre-oxidized to produce a protective aluminum oxide coating, it was found that the yield of solid ethylene polymer was only 1.1 g. from a charge of 42 g. (conditions: 113° C., ethylene pressure of 1100 p.s.i., 4 hours, using 40 g. of $V_2O_5$—Al catalyst and 2.5 g. of aluminum trimethyl co-catalyst).

From the foregoing data it will be appreciated that the $V_2O_5$—$Al_2O_3$—Al cyatalyst is characterized by outstanding polymerization efficiency. It will be noted that the concentration of $V_2O_5$, based on ethylene, was only 0.77 weight percent in the $V_2O_5$—$Al_2O_3$—Al catalyst.

*Example 5*

This example is similar to Example 1 but the amount of metal oxide catalyst was reduced and the benzene solvent was replaced by n-heptane. The autoclave was charged with 10 g. of 17 weight percent $V_2O_5$—alumina prepared by the method of Example 1 and calcined before use in a muffle furnace at 570° C. and atmospheric pressure for 12 hours. In addition, the reactor was charged with 79 g. of n-heptane, 2.7 g. of aluminum trimethyl and 53 g. of ethylene in all. The reactor contents were heated with shaking to 116° C. under maximum ethylene presusre of 1000 p.s.i. for a total contact period of 3 hours. The reaction mixture was worked up as in Example 1. The reaction was found to yield 41 g. of a tough, solid polymer of ethylene and no liquid or gaseous products.

*Example 6*

This example is similar to Example 5 but is characterized by the use of a substantially lower proportion of the aluminum trimethyl co-catalyst. The reactor was charged with 10 g. of the same vanadia-alumina catalyst as was used in Example 5, which was calcined in a muffle furnace at 570° C. and atmospheric pressure for 14 hours. The reactor was charged also with 77 g. of n-heptane, 0.46 g. of aluminum trimethyl and 44 g. of ethylene. The reactor contents were heated while rocking from room temperature to 107° C. from an initial ethylene partial pressure of 300 p.s.i. to a maximum ethylene partial pressure of 1000 p.s.i. The total period of contacting ethylene with the catalysts was 3.5 hours. Upon working up the reaction products as before, it was found that the reaction product was 8 g. of a white, tough, solid polymer from ethylene. No gaseous or liquid products were formed. This example indicates the successful use of relatively small proportions of both catalyst and co-catalyst.

*Example 7*

The steel rocking bomb was charged with 21 g. of a vanadia-alumina catalyst having the same composition as the catalyst of Example 1, which was calcined before use in a muffle furnace at atmospheric pressure and 600° C. for 16 hours. The reactor was also charged with 1.61 g. of aluminum trimethyl, 63 g. of n-heptane and 68 g. of propylene. The reactor contents were heated with shaking to 99° C. at pressures ranging from 60 p.s.i. to a maximum of 400 p.s.i. for a total contacting period of 20 hours. The reaction products were worked up as before to yield 1.2 g. of liquid product and 6.0 g. of a solid polymer from propylene having a specific gravity (24/24° C.) of 0.9507 and melt viscosity of $1.6 \times 10^{10}$. The solid product was not sufficiently soluble in boiling xylenes to permit determination of its specific viscosity by the Staudinger method.

*Example 8*

The rocking bomb reactor was charged with 20 g. of catalyst having the same composition as the catalyst of Example 1, which was calcined before use in a muffle furnace at atmospheric pressure and 570° C. for 20 hours. The reactor was also charged with 1.21 g. of aluminum trimethyl, 24 g. of ethylene, 61 g. of propylene and 58 g. of n-heptane. The contents of the reactor were heated with agitation to 99° C. at pressures varying from 60 p.s.i. to a maximum of 800 p.s.i., over a total contacting period of 20 hours. The reaction products were worked up as before and it was found that no liquid products were produced. The reaction yielded 27 g. of solid products having a specific gravity (24/24° C.) of 0.9476 and melt viscosity of $2.3 \times 10^7$. The solid product was not sufficiently soluble in boiling xylenes to permit determination of its specific viscosity by the Staudinger method.

*Example 9*

The process of Example 1 is repeated but 2 g. of aluminum triphenyl are substituted for aluminum trimethyl. The reaction products are worked up as before to yield a white, tough, solid polymer from ethylene.

*Example 10*

The process of Example 1 is repeated but the metal oxide catalyst is 10 weight percent of $Cb_2O_5$ supported upon activated alumina. The products are worked up as before to yield a tough, solid, white polymer of ethylene.

*Example 11*

The process of Example 1 is repeated but 10 weight percent of $Ta_2O_5$ supported upon activated alumina is susbtituted in equal parts by weight for the vanadia-alumina catalyst of Example 1. The reaction mixture is worked up as in Example 1 to separate and recover normally solid polyethylenes.

The polymers produced by the process of this invention can be subjected to such after-treatment as may be desired to fit them for particular uses or to impart desired properties. Thus, the polymers can be extruded, mechanically milled, filmed or cast, or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, gas barriers, binders, etc. to even a wider extent than polyethylenes made by prior processes.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes, such as paraffin or petrolatum waxes, with ester waxes, with high molecular weight polybutylenes, and with other organic materials. Small proportions between about .01 and about 1 percent of the various polymers produced by the process of the present invention can be dissolved or dispersed in hydrocarbon lubricating oils to increase V.I. and to decrease oil consumption when the compounded oils are employed in motors. The polymerization products having molecular weights of 50,000 or more, provided by the present invention, can be employed in small proportions to substantially increase the viscosity of fluent liquid hydrocarbon oils and as gelling agents for such oils.

The polymers produced by the present process can be subjected to chemical modifying treatments, such as halogenation, halogenation followed by dehalogenation, sulfohalogenation by treatment with sulfuryl chloride or mixtures of chlorine and sulfur dioxide, sulfonation, and other reactions to which hydrocarbons may be subjected.

Having thus described our invention, what we claim is:

1. In a polymerization process for the production of a normally solid polymer, the steps of contacting a charging stock comprising a mono-olefinic hydrocarbon having 2 to 4 carbon atoms, inclusive, per molecule with a catalyst comprising an oxide of a metal of group 5a of the periodic table and with a co-catalyst having the formula $AlR_3$, in which R is selected from the class consisting of hydrogen and monovalent hydrocarbon radicals.

2. The process of claim 1 which is effected in the presence of an inert liquid solvent for said co-catalyst and for said mono-olefinic hydrocarbon.

3. The process of claim 1 wherein said oxide is supported upon a major proportion of a difficultly reducible metal oxide.

4. The process of claim 1 wherein said oxide catalyst is partially pre-reduced before use.

5. In a process for the polymerization of ethylene, the steps of contacting ethylene with a catalyst comprising an oxide of a metal of group 5a of the periodic table and with a co-catalyst having the formula $AlR_3$, in which R is selected from the class consisting of hydrogen and monovalent hydrocarbon radicals, effecting said contacting at a suitable polymerization temperature between about 50° C. and about 230° C., and recovering a resinous material having a melt viscosity of at least about $1\times10^3$.

6. The process of claim 5 wherein said oxide is an oxide of vanadium and said co-catalyst is a trialkyl aluminum.

7. The process of claim 6 wherein said oxide is $V_2O_5$.

8. The process of claim 6 wherein said trialkyl aluminum is trimethyl aluminum.

9. A process for the conversion of propylene to a normally solid polymer, which process comprises contacting propylene under polymerization conditions with a catalyst comprising an oxide of a metal of group 5a of the periodic table and with a co-catalyst having the formula $AlR_3$, in which R is selected from the class consisting of hydrogen and monovalent hydrocarbon radicals, and recovering a normally solid polymer of propylene thus produced.

10. A process for the conversion of a butene to a normally solid polymer, which process comprises contacting said butene under polymerization conditions with a catalyst comprising an oxide of a metal of group 5a of the periodic table and with a co-catalyst having the formula $AlR_3$, in which R is selected from the class consisting of hydrogen and monovalent hydrocarbon radicals, and recovering a normally solid polymer of a butene thus produced.

11. The process of claim 10 wherein said butene is 1-butene.

12. In a polymerization process for the production of a normally solid polymer, the steps of contacting (1) a solution comprising a substantially inert hydrocarbon reaction medium and a charging stock comprising a mono-olefinic hydrocarbon having 2 to 4 carbon atoms, inclusive, per molecule and, in said solution, a co-catalyst having the formula $AlR_3$, wherein R is an alkyl radical, with (2) a heterogeneous catalyst comprising a minor proportion of a group 5a metal pentoxide extended upon a major proportion of a difficultly reducible metal oxide; effecting said contacting under polymerization conditions including a suitable temperature in the range of about 50° C. to about 230° C.; recovering a normally solid polymer thus produced.

13. The process of claim 12 wherein said oxide catalyst is partially pre-reduced before use.

14. The process of claim 12 wherein said oxide is vanadium pentoxide.

15. The process of claim 12 wherein said oxide is columbium pentoxide.

16. The process of claim 12 wherein said oxide is tantalum pentoxide.

17. In a polymerization process for the production of a normally solid polymer, the steps of contacting a charging stock comprising a mono-olefinic hydrocarbon having 2 to 4 carbon atoms, inclusive, per molecule with a catalyst comprising a minor proportion of a partially reduced oxide of a metal of group 5a of the periodic table supported upon a major proportion of a difficultly reducible metal oxide and with a co-catalyst having the formula $AlR_3$, in which R is selected from the class consisting of hydrogen and mono-valent hydrocarbon radicals, the proportion of said group 5a catalyst being between about 0.001 to about 20 percent by weight and the proportion of said $AlR_3$ co-catalyst being between about 0.001 and about 20 percent by weight, with respect to said olefin charging stock, effecting said contacting in a substantially inert hydrocarbon reaction medium at a suitable polymerization temperature between about 50° C. and about 230° C. under superatmospheric pressure, and recovering a normally solid polymer thus produced.

18. In a polymerization process for the production of a normally solid polymer, the steps of contacting a charging stock comprising a mono-olefinic hydrocarbon having 2 to 4 carbon atoms, inclusive, per molecule with a co-catalyst having the formula $AlR_3$ in which R is selected from the class consisting of hydrogen and mono-valent hydrocarbon radicals and with a catalyst comprising a minor proportion of a metal of group 5a of the period table extended as a surface coating on a supporting material comprising a metal oxide surface coated upon the same metal, effecting said contacting under polymerization conditions including a suitable temperature between about 50° C. and about 230° C., and recovering a normally solid polymer thus produced.

19. The process of claim 18 wherein said supporting material comprises alumina coated upon aluminum.

20. The process of claim 18 wherein said group 5a metal oxide is an oxide of vanadium and said supporting material consists essentially of alumina coated upon aluminum.

21. The process of claim 20 wherein said charging stock comprises ethylene.

22. In a polymerization process for the production of a normally solid polymer the steps of contacting propylene with a catalyst comprising vanadium pentoxide and with a co-catalyst having the formula $AlR_3$ in which R is selected from the class consisting of hydrogen and monovalent hydrocarbon radicals.

23. The process of claim 22 in which R is a monovalent hydrocarbon radical.

24. The process of claim 22 in which R is an alkyl radical.

25. In a polymerization process for the production of a normally solid polymer the steps of contacting propylene with a catalyst comprising a minor proportion of vanadium pentoxide supported upon a major proportion of a difficultly reducible metal oxide and with a co-catalyst having the formula $AlR_3$ in which R is a monovalent hydrocarbon radical the proportion of each of said catalyst and co-catalyst being between about 0.001 to about 20% by weight with respect to said propylene, effecting said contacting in a substantially inert hydrocarbon reaction medium at a suitable polymerization temperature between about 50° C. and between about 230° C., and recovering a normally solid polymer thus produced.

26. The process of claim 25 wherein said reaction medium is an aromatic hydrocarbon.

27. The process of claim 25 wherein said reaction medium is benzene.

References Cited in the file of this patent

UNITED STATES PATENTS

| | | |
|---|---|---|
| 1,672,308 | Downs | June 5, 1928 |
| 1,844,998 | Wietzel | Feb. 16, 1932 |
| 2,684,951 | Mottern | July 27, 1954 |
| 2,691,647 | Field et al. | Oct. 12, 1954 |
| 2,699,457 | Ziegler et al. | Jan. 11, 1955 |
| 2,727,024 | Field et al. | Dec. 13, 1955 |
| 2,781,410 | Ziegler et al. | Feb. 12, 1957 |

FOREIGN PATENTS

| | | |
|---|---|---|
| 534,792 | Belgium | Jan. 31, 1955 |